Sept. 27, 1966     E. BABICH ETAL     3,274,862
BORING BAR
Filed April 12, 1965
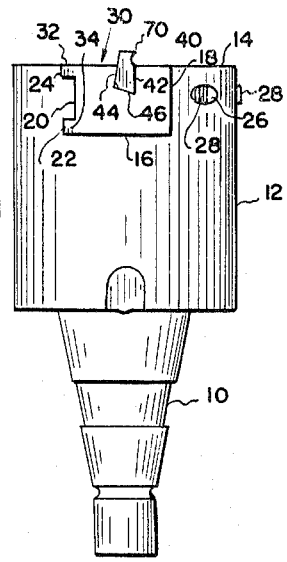
FIG. 1
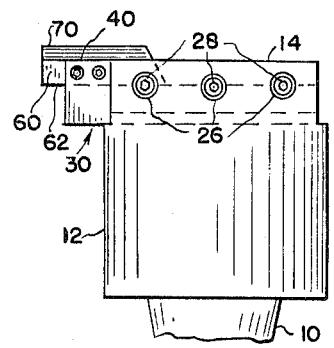
FIG. 2
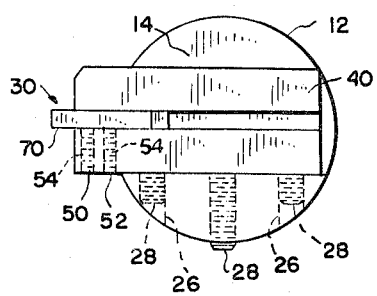
FIG. 3
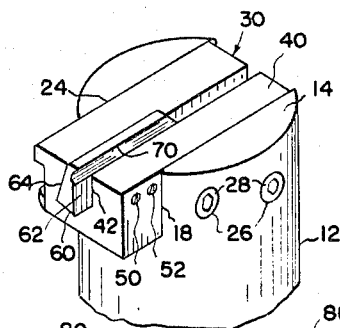
FIG. 4
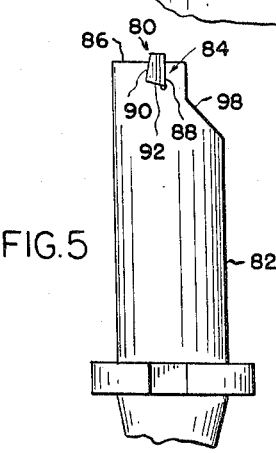
FIG. 5
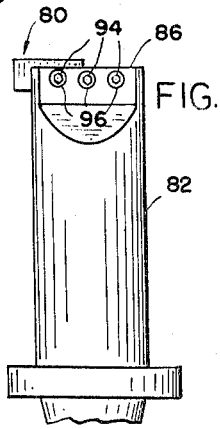
FIG. 6
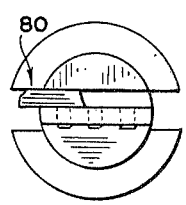
FIG. 7
FIG. 8
INVENTORS.
EDWARD BABICH
ROBERT H. LEIDAL
BY
ATTORNEY

United States Patent Office 3,274,862
Patented Sept. 27, 1966

3,274,862
BORING BAR
Edward Babich, Farmington, and Robert H. Leidal, Livonia, Mich., assignors to Galaxy Boring Company, Farmington, Mich., a corporation of Michigan
Filed Apr. 12, 1965, Ser. No. 447,333
8 Claims. (Cl. 77—58)

This invention relates to a form of construction for supports for cutting tools in the nature of boring bars and the like. It more particularly relates to a novel configuration for that end of the boring bar which is adapted to retain a cutter.

A wide variety of constructions for the cutter retaining portions of boring bars are known. The present invention relates to such a bar which is extremely simple and easy to form so as to be low in cost and reliable in operation, and which exhibits those properties which are deemed most desirable in a boring bar construction, namely high rigidity of cutter retention, simplicity of cutter insertion and removal, and high tolerance to small variations in cutter dimensions.

Broadly, the present invention consists of a boring bar having a normal configuration with the exception of its end which is adapted to support a cutter. That end supports a solid, unitary member which may or may not be integral with the bar, and which has an end face extending normally to the longitudinal axis of the boring bar. A slot is formed across the entire width of this face so as to produce end openings in the two opposite sides of the end of the member. The slot has a pair of elongated sides, one of the edges of each of the elongated sides being formed by its contact with the end face of the cutter holding section. The other elongated edges of the sides are defined by their intersection with a flat, elongated bottom section. The sides are skewed with respect to one another so that the elongated edges which define their intersection with the end face are closer together to one another than the edges which define their line of contact with the bottom. However, lines on the faces drawn parallel to their elongated edges are parallel to one another so that the slot has a uniform cross-section throughout its length. The flat bottom of the slot preferably extends substantially normally to one of the skewed sides, and forms an acute angle with the other slot side. The slot side which forms an acute angle to the bottom preferably extends approximately normally to the end face of the cutter support section. At least one of the cutter support faces defined by one of the slot sides and the end section of the tool cutter support has a plurality of screw holes formed normally in it. These holes retain set screws which may be tightened from the outer side of the cutter support to fix a cutter within the slot.

The cutter used in connection with the present invention is elongated with a generally rectangular cross-section. Three of the sides of the rectangle bear the same angular relation to one another as do the two sides in the bottom of the slot in the cutter support and the fourth side has the sharpened cutting edge formed thereon. The cutter is adapted to slide into the slot in the cutter support section from one end. The configuration of the slot with the sides skewed toward one another at the open end restrains the cutter against motion except in the direction of the slot. The sharpened edge of the cutter is adapted to extend through the open end of the slot beyond the end face. By tightening the set screws against the cutter, the cutter is restrained against motion along the axis of the slot. The cutter preferably has one section extending out of the slot on one of the sides to produce a normal boring bar configuration.

The following specification will disclose the details of construction of two preferred embodiments of the invention. In one of the embodiments the cutter support slot is formed directly in the end of the boring bar itself so that a bar is simply prepared for use by disposing the cutter in the slot and locking it with set screws. In the other embodiment, the slot is formed across the length of a rectangular tool retaining block. This block is in turn fitted in a plain rectangular slot formed across the end of the front face of the boring bar. A suitable key and keyway arrangement is adapted to restrain the cutter support block within the boring bar and set screws may lock the block against the axial motion in its retaining slot. The cutter is then supported in the block which may extend out of the side of the slot in the bar so as to allow the cutter to project farther beyond the edge of the bar than would be possible if the cutter were supported directly in a slot formed in the bar. The key and keyway which join the cutter support block to the boring bar in this second configuration, are so formed that the block may be reversed within the bar so that the cutter does not extend beyond the outer face of the boring bar but rather has its cutter surface directed inwardly toward the machine end of the bar. This allows the bar to be used for back-boring where that type of action is desirable.

It is therefore seen to be a primary object of the present invention to provide a boring bar construction wherein a cutter is retained in a slot formed in an integral member, which may or may not be the bar itself, the slot having skewed opposed sides which intersects the end face of the support and a flat bottom along lines which are parallel to one another, and wherein the flat bottom is substantially normal to one of the sides.

Another object is to provide such a cutter configuration wherein the bottom is essentially normal to one of the sides of the slot, is formed acutely to the second side, and the second side extends generally normally to the end face of the support so that the two opposed sides of the slot are closer together at the end face than at their intersection with the bottom member.

Another object is to provide such a configuration wherein the cutter has a cross-section similar to the slot and set screws are threaded in holes on one of the sides of the cutter support and extend through one of the sides of the slot so that the set screws may be employed to lock a cutter against motion along the length of the slot.

Still another object is to provide such a boring bar wherein the slot is formed in a cutter support block which is itself retained within a rectangular slot formed in the end of the bar.

Other objects, advantages, and applications of the present invention will be made apparent by the following detailed description of two embodiments of the invention. The description makes reference to the accompanying drawings in which:

FIGURE 1 is a side view of the first embodiment of the invention wherein a cutter is retained within a support block which is itself disposed in a slot in a normal boring bar;

FIGURE 2 is a view of the end of the boring bar of FIGURE 1 from a side normal to view of FIGURE 1;

FIGURE 3 is a top view of the end of the bar of FIGURE 1;

FIGURE 4 is a perspective view of the cutting end of the bar of FIGURE 1;

FIGURE 5 is a side view of the cutting end of a second embodiment of the invention wherein the cutter is supported directly in the end face of the boring bar;

FIGURE 6 is a side view of the cutter end of the boring bar of FIGURE 5 taken from a side normal to the view of FIGURE 5;

FIGURE 7 is a top view of the bar of FIGURE 5; and
FIGURE 8 is a perspective view of the bar of FIGURE 5.

Referring to the drawings, the present invention may be used with any boring bar of conventional design. The embodiment of FIGURES 1–4 is used in connection with a bar having an end 10 adapted to be fixed within a boring mill and an extending cutter support section 12. The section 12 terminates in a flat face 14 which extends normally to the longitudinal axis of the bar. The section 12 is cylindrical in cross-section and is symmetrically formed about the longitudinal axis.

A slot having a flat base 16 and a pair of parallel opposed sides 18 and 20, both of which extend normally to the face 14, is formed completely across the end of the face. A pair of keyways 22 and 24 are formed in the upper and lower edges of the side 20. Three threaded holes 26 which extend normally to the slot side 18 are formed in the end of the bore between the slot 18 and outer wall of the boring bar. Socket head set screws 28 are adapted to be threaded into these holes.

A cutter retaining block, generally indicated at 30 has a cross-section similar to that of the slot formed by the sides 16, 18 and 20. The block 30 has a pair of extending keys 32 and 34 which are formed on the longitudinal edges of one of the faces of the block and which mate with the keyways 22 and 24. The block also has faces which mate with the walls 16 and 18 of the slot. The outer configuration of the block 30 is such that it may be inserted in the slot in the boring bar and make a sliding fit therewith.

The block 30 has an upper surface 40 which is preferably adapted to lie parallel to and in alignment with the end surface 14 of the boring bar when the block 30 is disposed within the slot in the bar.

A cutter supporting slot is formed longitudinally across the face 40 of the block 30 between the parallel sides 18 and 20. This cutter retaining slot has one side 42 which preferably extends normally to the side 40. The slot has a second opposed side 44 which is skewed with respect to the side 42. However, lines on the sides 42 and 44 parallel to the surface 40 are parallel to each other. Thus, the slot has a uniform cross-section throughout its length.

At their upper longitudinal edges the sides 42 and 44 terminate in lines of contact with the upper face 40 of the block. At their lower ends the longitudinal edges of the sides 42 and 44 terminate at their intersection with a flat surface 46 which forms the bottom of the slot. The flat surface 46 preferably extends normally to the surface 44 and thus intersects the surface 42 in an acute angle.

A pair of holes 50 and 52 are formed parallel to the surface 40 through the side of the block so as to pass through the side 42 of the slot. These holes are threaded and set screws 54 may thread therein.

The cutter used in connection with the present invention has three sides 60, 62 and 64 which are angularly aligned with respect to one another in the same manner as are the slot sides 42, 44 and 46. The cutter thus makes a sliding fit within the slot and the fact that the sides 44 and 42 are skewed with respect to one another and are closer together at their top than at their bottom, prevents motion of the cutter within the slot in any direction except longitudinally along the slot. By tightening the set screws 54, the cutter may be securely locked in place within the slot.

The cutter has an upper extending surface 70 which projects beyond the face 40 of the cutter support block. The cutter support block 30 is preferably longer than the diameter of the boring bar end 12 so that it projects beyond the end of its support slot on one side. The holes 50 and 52 are oriented on this side and cutter is locked within the bar 30 so that it too projects slightly beyond the termination of the block on the same side that the block extends beyond the bar.

The boring bar is used for cutting in a normal way. If it is desired to perform back-boring the cutter is locked within the block so that it extends completely beyond the end of the bar and the block 30 is removed from the bar end and rotated through 180 degrees so that the keys 32 and 34 reverse their position within the keyways 22 and 24. Then the face 40 of the cutter support block projects toward the end 10 of the bar and the cutter is in proper position for back-boring.

In the embodiment of the invention disclosed in FIGURES 5–8 a cutter, generally indicated at 80, is supported in the end 82 of a boring bar by means of a slot, generally indicated at 84, which is formed directly across the end of the bar and does not include a support block of the type used in the first embodiment. The slot 84 is formed across the width of the end face 86 of the bar 82. This end face 86 extends normally to the longitudinal axis of the bar. The slot has a first face 88 which extends generally normally to the face 86, and a second face 90 which is skewed with respect to the face 88. Again, lines on the faces 88 and 90 which extend normally to the axis of the bar are parallel to one another. The faces 88 and 90 are closest to one another at their upper intersections with the face 86 and are farthest apart from one another at their intersections with the bottom of the slot 92. The bottom extends generally normally to the face 90 and forms an acute angle with the face 88. The cutter 80 has the same configuration as in the first embodiment and makes a sliding fit with the slot. It is locked in the slot by set screws 94 which fit in threaded holes 96 formed in a recess section 98 on one side of the bar. The holes extend normally through the sides of the slot 88 and are adapted to lock the cutter 80 against motion along the length of this slot.

It is thus seen that one very important aspect of the present invention is the fact that the slot is cut integrally out of a unitary section of material rather than being formed with removable side cap. This construction, while simplifying the manufacture of the bar, adds greatly to its rigidity and the security of the retention of the cutter within the bar. Another important aspect is that the sides of the slot are skewed with respect to one another and are narrower at their top opening than at the bottom so that a cutter slid into the slot from the end is locked against all motion except along the length of the slot. That one of the faces is cut normally to the end of the bar assists in the manufacture and greatly simplifies the geometry of the cutter used with the bar.

Having thus described our invention, we claim:

1. An elongated boring bar having a cutter end support section with a face extending normally to the longitudinal axis of the bar; a slot of uniform cross-section formed across the end of the face, said slot having a pair of opposed sides formed from a unitary section skewed with respect to one another so that lines along each parallel to the end face of the bar are parallel to one another and so that the edges of the sides adjacent to the face of the cutting support are closer to one another than the edges at the bottom of the slot, one of the sides extending normally to said end supporting section face and the bottom of the slot extending normally to the other side thereof; a plurality of holes formed through one side of the bar from the side of the slot which extends normally to the end support section face, normally to that side; set screws threaded in said holes; and an elongated cutter having a cross-sectional configuration such as to allow it to slide into the slot from the end and to be locked therein by the set screws.

2. The bar of claim 1 wherein the cutter end support section is integral with the rest of the bar.

3. The bar of claim 1 wherein the cutter end support section is formed in a block which is detachable from the bar.

4. The bar of claim 3 wherein the cutter support section has a generally rectangular cross-section and a pair of keys extending outwardly from the opposed edges of one of its faces and the boring bar has a slot formed across its end face with a configuration adapted to receive the block, the slot configuration having a pair of keyways on one of the opposed sides, one keyway running along the bottom of one side of the slot and the other keyway extending along the edge of the slot adjacent to the face, whereby the block may be disposed in either of two positions, one wherein the slot and the block extends outwardly from the face of the bar and the other wherein the slot of the block is disposed adjacent to the bottom of the slot in the bar.

5. An elongated boring bar having a cutter end support section with a face extending normally to the longitudinal axis of the bar; a first slot of uniform cross-section formed across the end of the face; a cutter support block having a cross-sectional configuration similar to the configuration of the first slot adapted to slide into the first slot from an end; means for locking the support block in the first slot so that one side of the block extends outwardly from the bar face; a second slot formed in the side of the support block which extends outwardly from the bar face, said second slot having a pair of opposed sides skewed with respect to one another so that lines along each parallel to the exposed side of the block are parallel to one another, so that the edges of the sides adjacent to the exposed surface of the block are closer to one another than the edges at the bottom of the second slot, one of said sides extending normally to the outer surface of said support block which is parallel to said bar face, and the bottom of the slot extending normally to the opposite side; a plurality of holes formed through one side of the block from the side of the slot which extends normally to the face of the support block; set screws threaded in said holes; and an elongated cutter having a cross-sectional configuration such as to allow it to slide into the second slot from the end of the block and to be locked therein by the set screws.

6. The boring bar of claim 5 wherein the cross-sectional configuration of the first slot and the cross-sectional configuration of the cutter support block are such that the cutter support block may be disposed in either of two orientations within the bar, one wherein the surface of the block which has the second slot therein extends outwardly from the face of the bar, and the second wherein the surface of the block which has the second slot therein is in abutment to the bottom of the slot formed in the bar face.

7. An elongated boring bar having a cutter end support section with a face extending normally to the longitudinal axis of the bar; a slot of uniform cross-section formed across the end of the face, said slot having a pair of opposed sides formed from the uniform section, skewed with respect to one another so that lines along each parallel to the end face of the bar are parallel to one another and so that the edges of the sides adjacent to the face of the cutting support are closer to one another than the edges at the bottom of the slot, one of said sides extending substantially normally to the face of the bar and the bottom of the slot extending substantially normally to the other side of the slot; an elongated cutter having a cross-sectional configuration such as to allow it to slide into the slot from the end; and set screws for locking the cutter within the slot against motion in the direction of the slot, the set screws passing through the side of the slot which extends substantially normally to the face of the bar.

8. An elongated boring bar having a cutter end supporting section with a face extending normally to the longitudinal axis of the bar; a first slot of uniform cross-section formed across the end of the face; a cutter support block having a cross-sectional configuration similar to the configuration of the first slot adapted to slide into the first slot from an end; means for locking the support block in the first slot so that one side of the block extends outwardly from the bar face; a second slot formed in the side of the support block which extends outwardly from the bar face, said second slot having a pair of opposed sides skewed with respect to one another so that lines along each parallel to the exposed side of the block are parallel to one another, so that the edges of the sides adjacent to the exposed surface of the block are closer to one another than the edges of the bottom slot; the cross-sectional configuration of the first slot and the cross-sectional configuration of the cutter support block being such that the cutter support block may be disposed in either of two orientations within the bar, one wherein the surface of the block which has the second slot therein extends outwardly from the face of the bar and the second wherein the surface of the block which has the second slot therein is in abutment to the bottom of the slot formed in the bar face; a plurality of holes formed through one end of the slot from one of the faces of the second slot normally to that face; set screws threaded in said holes; and an elongated cutter having a cross-sectional configuration such as to allow it to slide into the second slot from the end of the block and to be locked therein by the set screws.

References Cited by the Examiner

UNITED STATES PATENTS 2,398,491  4/1946  Bell _____ 29—105 X
3,187,408  6/1965  Titterud _____ 29—96

WILLIAM W. DYER, Jr., *Primary Examiner.*

G. A. DOST, *Assistant Examiner.*